United States Patent [19]

Okumura et al.

[11] Patent Number: 5,489,978
[45] Date of Patent: Feb. 6, 1996

[54] LENS MEASURING APPARATUS

[75] Inventors: Toshiaki Okumura; Yoshimi Kohayakawa, both of Yokohama, Japan

[73] Assignee: Canon Kabushiki Kaisha, Tokyo, Japan

[21] Appl. No.: 145,083

[22] Filed: Nov. 3, 1993

[30] Foreign Application Priority Data

Nov. 5, 1992 [JP] Japan ................................. 4-295918
Feb. 8, 1993 [JP] Japan ................................. 5-043252

[51] Int. Cl.⁶ ............................................. G01B 9/00
[52] U.S. Cl. ............................................. 356/124; 356/127
[58] Field of Search ............................................. 356/124, 125, 356/126, 127

[56] References Cited

U.S. PATENT DOCUMENTS

| 4,123,163 | 10/1978 | Chace et al. | 356/127 |
| 5,173,739 | 12/1992 | Kurachi et al. | 356/124 |
| 5,303,022 | 4/1994 | Humphrey et al. | 356/124 |

FOREIGN PATENT DOCUMENTS 193897  9/1986  European Pat. Off. ............... 356/124

*Primary Examiner*—F. L. Evans
*Attorney, Agent, or Firm*—Fitzpatrick, Cella, Harper & Scinto

[57] ABSTRACT

A lens measuring apparatus has a light beam projecting unit for projecting a light beam onto a lens to be examined, a photoelectric detector for detecting the light beam projected onto the lens to be examined, and a calculator for calculating the refraction information of the lens to be examined on the basis of the detection by the photoelectric detector. The calculator, when it calculates the refraction information of the near viewing portion of a progressive focal lens as the lens to be examined, compares refraction information calculated successively while the examined position of the lens to be examined is moved with the already calculated and memorized refraction information of the far viewing portion of the lens to be examined and successively calculates additional power in each portion to be examined. The calculator further memorizes the maximum value of the successively calculated additional power while renewing it.

20 Claims, 7 Drawing Sheets

LENS MEASURING APPARATUS

BACKGROUND OF THE INVENTION

1. Field of the Invention

This invention relates to a lens refractivity measuring apparatus for use in an ophthalmologic clinic, an optician's shop or the like.

2. Related Background Art

In a conventional lens refractivity measuring apparatus when the refractive power of a progressive multifocal lens is to be measured, a mark is attached to a positioning sheet or the like prepared for each kind of lens in order to take aim at a position to be measured, and the measurement of refractive power at a far viewing position or a near viewing position is effected with the optical axis of the apparatus adjusted to this mark. Therefore, much time is required for the measurement of a progressive multifocal lens. Also, there is known a lens refractivity measuring apparatus in which whether the measuring optical axis is on a progressive zone is displayed when the additional power of a progressive multifocal lens is measured, but since the additional may vary in the progressive zone, it is difficult to judge where the measurement should be done.

SUMMARY OF THE INVENTION

It is an object of the present invention to solve the above-noted problem and to provide a lens refractivity measuring apparatus capable of readily accomplishing the measurement of the refractive power of a progressive multifocal lens.

Other objects of the present invention will become apparent from the following detailed description of some preferred embodiments of the invention.

DESCRIPTION OF THE PREFERRED EMBODIMENTS

The invention will hereinafter be described with reference to the drawings.

Figure 1:
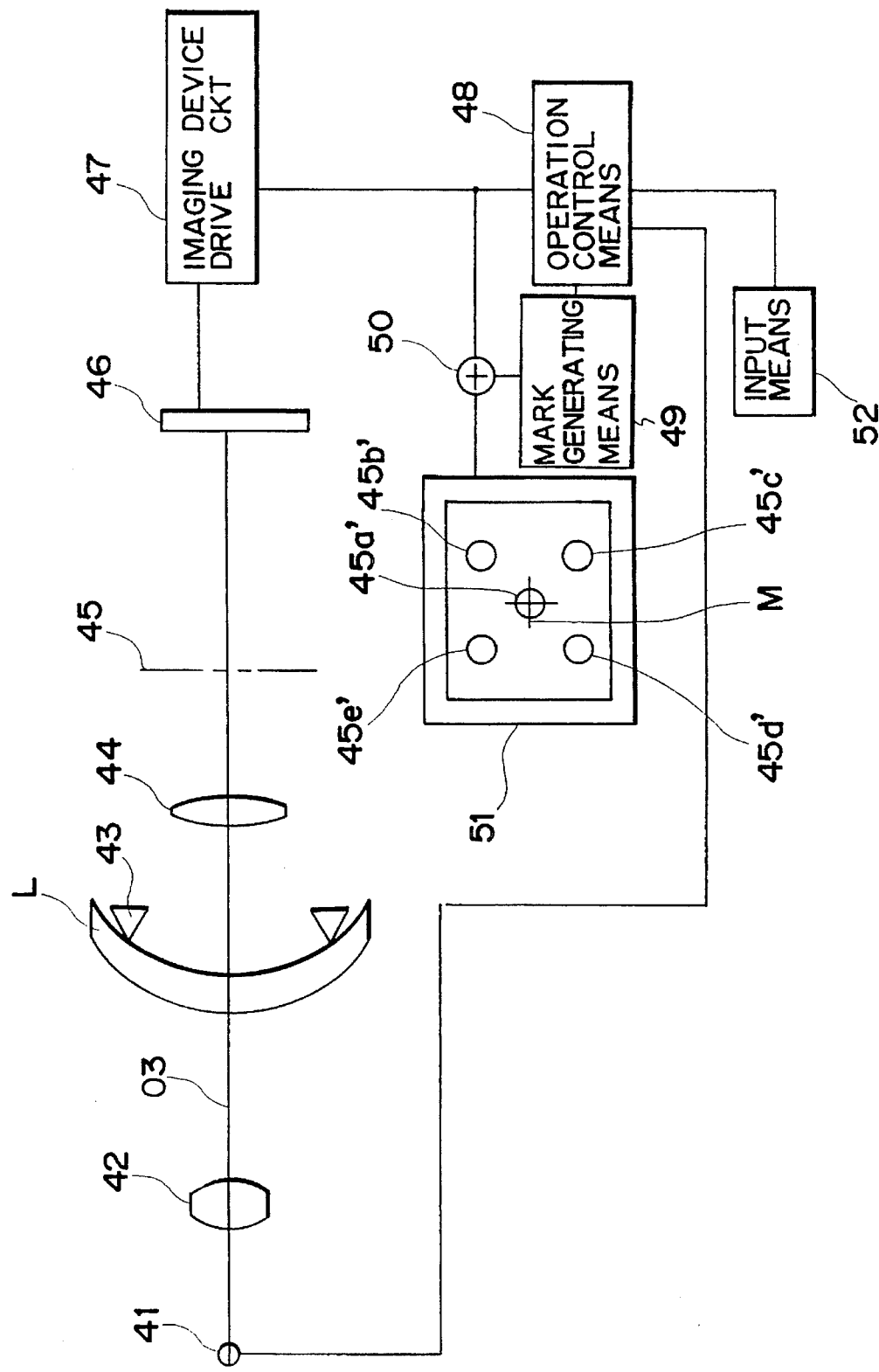
FIG. 1 shows a first embodiment of the present invention.
Figure 2:
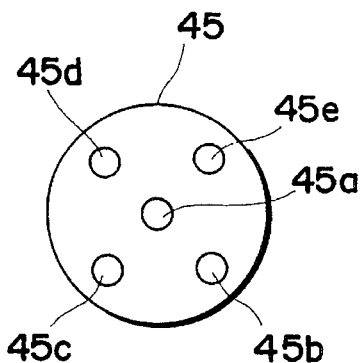
FIG. 2 is an illustration of a stop 45.

FIG. 1 shows the construction of a first embodiment of the present invention. On an optical axis 03 ahead of a light source 41 for measurement, there are provided in succession a collimator lens 42 for collimating a light beam, a contacting member 43 for supporting a lens L to be examined, a lens 44, a multiaperture stop 45 having an aperture 45a on the optical axis 03 and four apertures 45b to 45e symmetrically formed around the optical axis 03 as shown also in FIG. 2, and an imaging device 46. The imaging device 46 is driven by an imaging device drive circuit 47 and outputs a video signal, and the output video signal may be displayed on a TV monitor 51 via operation control means 48, such as an arithmetic and control unit, and synthesizing means 50, with images 45a' to 45e' by the multiaperture stop 45 and an alignment mark M generated by mark generating means 49. The operation control means 48 is connected to input means 52 and the light source 41 for measurement, and is designed to control the entire apparatus by an input signal from the input means 52 and calculate the refractive power and prismatic power of the lens L to be examined from the positional relations between light beam images on the imaging device 46. The input means 52 is comprised of a plurality of input means (such as a key and a switch).

During the measurement of the refractivity of the lens L to be examined, if the lens L to be examined is a spherical lens, it is brought into contact with the contacting member 43. When the light source 41 for measurement emits light, the light beam thereof is collimated by the collimator lens 42, is bent by the lens L to be examined and is projected onto the imaging device via the multiaperture stop 45. The position of the light beam from the multiaperture stop 45 depends on the magnitude of the refractive power of the lens L to be examined and therefore, by analyzing the position of the light beam on the imaging device 46, the refractive power of the lens L to be examined can be calculated. The images 45a' to 45e' of the multiaperture stop 45 are displayed on the TV monitor 51 with the alignment mark M, and the lens L to be examined is moved so that the image 45a' of the aperture 45a may coincide with the alignment mark M on the TV monitor 51, and when the image 45a' coincides with the alignment mark M, the input means 52 is depressed to memorize the refractive power by the operation control means 48, thus terminating the measurement.

Figure 5:
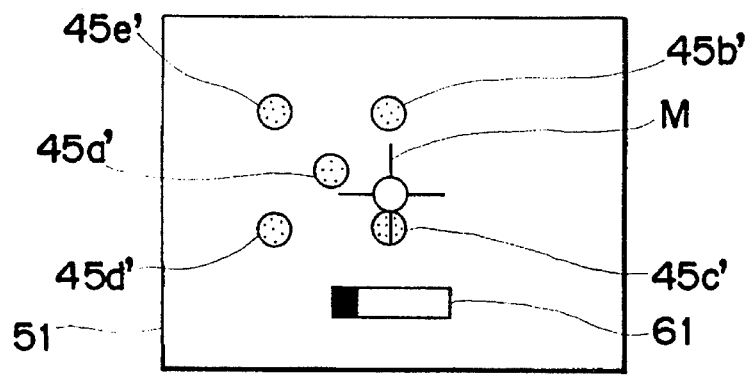
FIG. 5 shows an example of the display on a TV monitor 51 during the measurement of a spherical lens.

FIG. 5 is an illustration of the TV monitor 51 at this time, and shows a state in which the image 45a' of the aperture 45a is not coincident with the alignment mark M. A left to right prism indicator 61 indicates an enlarged vicinity of 0 of the prismatic power in the left to right direction by a figure (herein painted out in black), and is for accurately adjusting the prismatic power in the left to right direction to 0.

Figure 6:
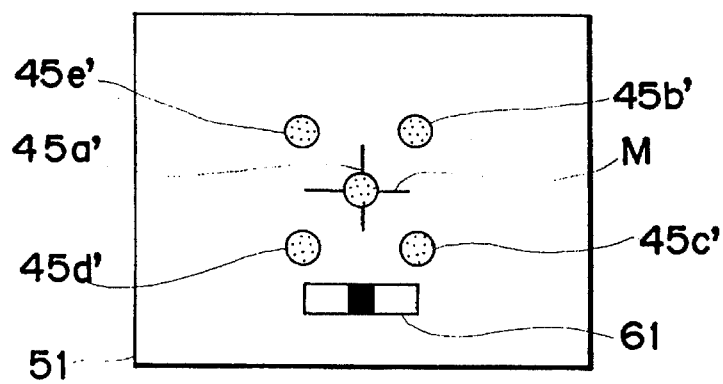
FIG. 6 shows an example of the display on the TV monitor 51 during e measurement of a spherical lens.

FIG. 6 shows a state in which the image 45a' of the aperture 45a is coincident with the alignment mark M.

Figure 3:
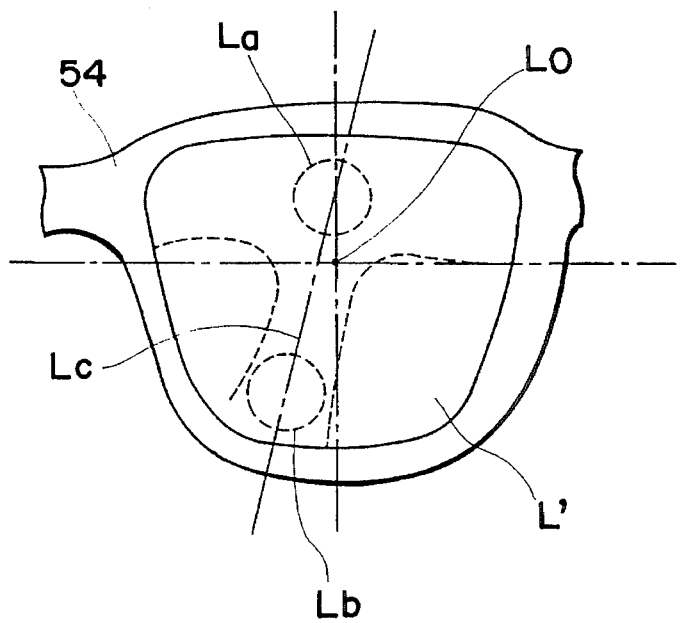
FIG. 3 is an illustration of a progressive focal lens.
Figure 4:
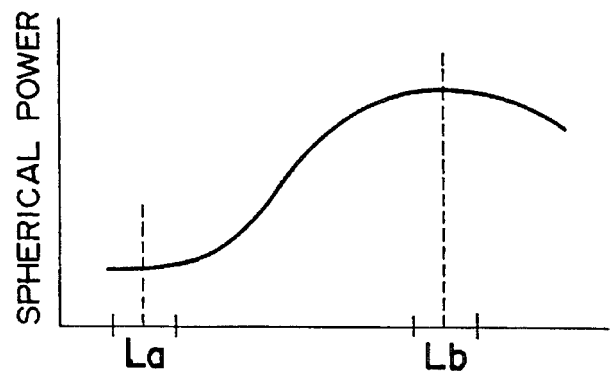
FIG. 4 is a graph of the progressive focal lens.

FIG. 3 is an illustration of a case where the lens L to be examined is a progressive focal lens. A progressive focal lens L' fitted in a spectacle frame 54, unlike a spherical lens, has its optical center L0, its measuring portion La for far viewing portion and its measuring portion Lb for near viewing portion disposed at different regions. The measuring portion La for far viewing portion is several millimeters above the center of the spectacle frame and is a point at which the left and right prismatic power are zero. The measuring portion Lb for near viewing portion is inwardly below the center of the spectacle frame and is a point at which the spherical power is substantially maximum. At a location called a progressive zone Lc passing from the measuring portion La for far viewing portion through the optical center L0 to the measuring portion Lb for near viewing portion, the cylindrical power and the axial angle of cylinder are substantially constant and the degree of sphericity is increased. FIG. 4 shows the magnitude of the spherical power measured along the progressive zone Lc.

Describing with reference to FIG. 1, in the progressive focal lens as described above, when the far viewing portion is to be measured, measurement is started with the lens L to be examined applied to the contacting member 43. When the measurement is started, the operation control means 48 continuously calculates the refractive power and the prismatic power of the lens L to be examined. In this state, the lens L to be examined is moved so that the left and right degrees of prism may be nearly zero in the vicinity which seems to be the far viewing portion so that the light beam may pass to the far viewing portion of the lens L to be examined, and the input means 52 is depressed and the refractive power at that point of time is memorized as the refractive power of the far viewing portion by the operation control means 48, thus terminating the measurement of the far viewing portion.

Figure 7:
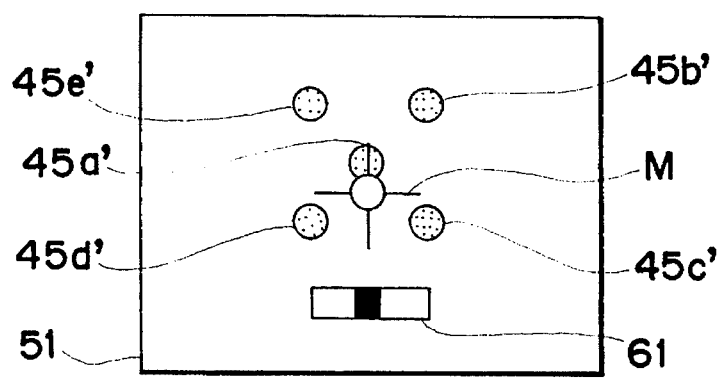
FIG. 7 shows an example of the display on the TV monitor 51 during the measurement of the portion of the progressive focal lens for seeing a farther portion.

FIG. 7 is an illustration of the TV monitor 51 at this time, and shows that the image 45a' of 45a is coincident with the vertical line of the alignment mark M and the left to right prism indicator 61 indicates a state in which the prismatic power in the left to right direction is zero.

Figure 8:
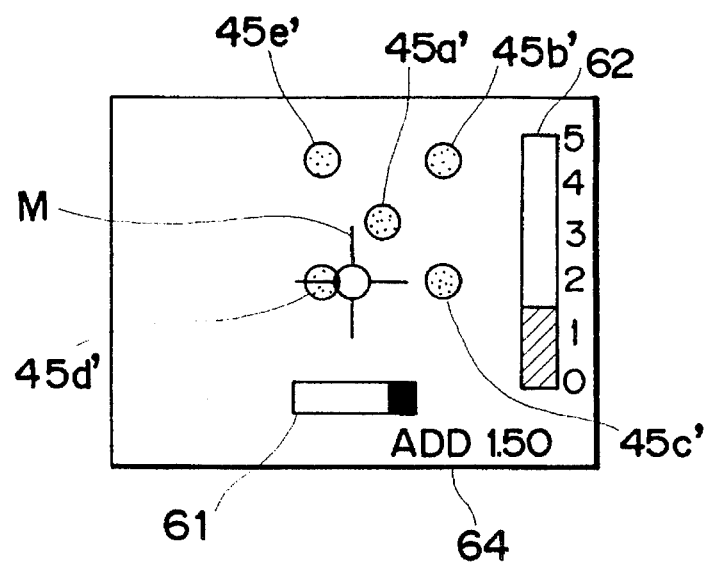
FIG. 8 shows an example of the display on the TV monitor 51 during the measurement of the portion of the progressive focal lens for seeing a nearer portion.
Figure 9:
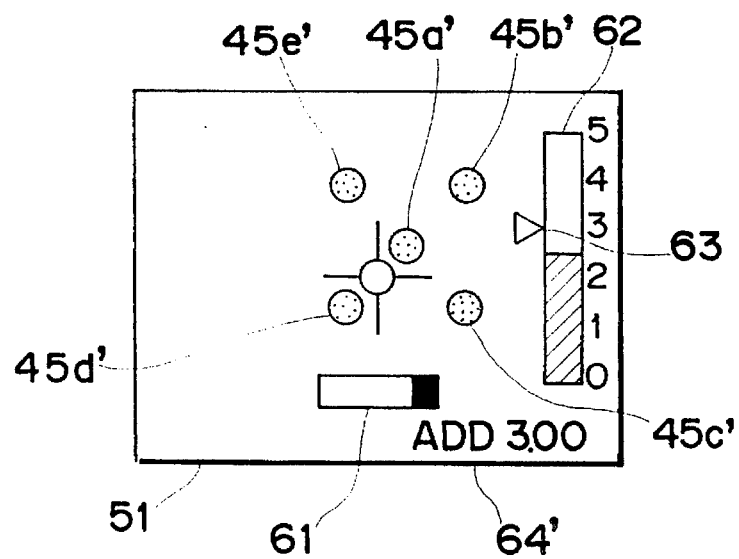
FIG. 9 shows an example of the display on the TV monitor 51 during the measurement of the portion of the progressive focal lens for seeing a nearer portion.

In the measurement of the near viewing portion, after the far viewing portion is measured and the measured value thereof is memorized, the apparatus is changed over to the near viewing portion additional power measuring mode by the input means 52 of FIG. 1 and measurement is started with the lens L to be examined applied to the contacting member 43. When the measurement is started, the operation control means 48 continuously calculates the refractive power and the prismatic power as in the case of the measurement of the far viewing portion, and calculates the additional power. FIG. 8 is an illustration of the TV monitor 51 at this time and the calculated additional power is displayed by numerical value display 64 and additional power bar graph 62. When at this time, the lens L to be examined is moved back and forth and to left and right in the vicinity which seems to be the near viewing portion so that the light beam may pass to the measuring portion Lb for near viewing portion of the lens L to be examined, the measured value thereof is compared with the memorized measured value of the far viewing portion, and if the cylindrical power and the axial angle thereof are substantially coincident with each other and the additional power is greater than the already memorized additional power, the input time is renewed and memorized, and the memorized value is displayed as the additional power and also, in the additional power bar graph 62, that memorized value is indicated by an additional power maximum value mark 63. The additional power bar graph 62 always indicates the additional power at the then measuring point. It is to be understood that the initial value of the additional power is zero. FIG. 9 is an illustration of the TV monitor 51 at this time, and the memorized additional power is displayed by numerical value display 64' and additional power maximum value mark 63.

Figure 10:
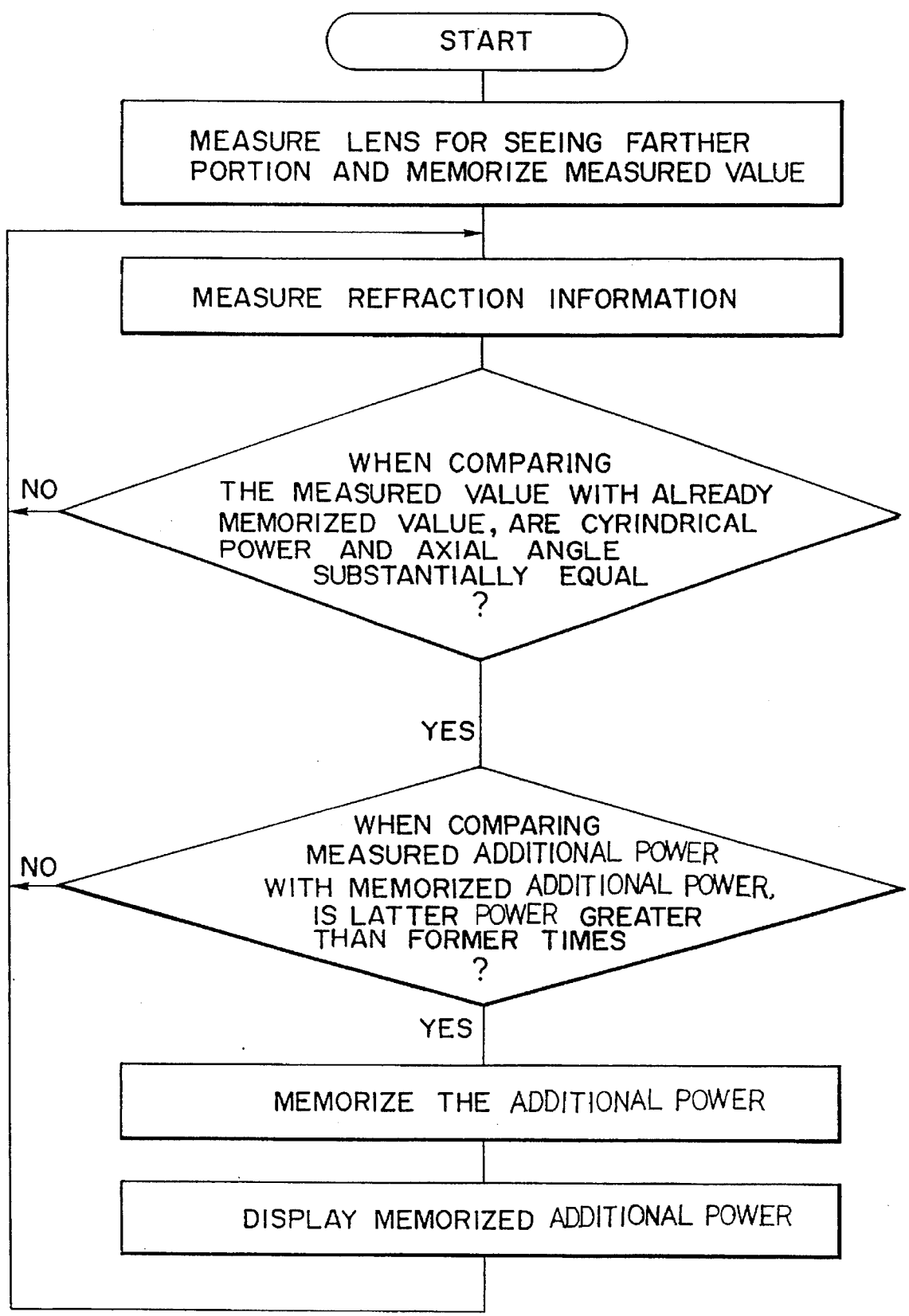
FIG. 10 is a flow chart of the measurement of the portion for seeing a nearer portion.

As described above, the lens L to be examined is moved back and forth and to left and right for a while in the vicinity of the measuring portion Lb for near viewing portion of the lens L to be examined whereby the cylindrical power and the axial angle thereof substantially coincide with each other, and the additional power substantially in the measuring portion Lb for near viewing portion in which the spherical power is maximum is memorized and displayed, whereafter the additional power will no longer vary. Thereafter, the input means 52 of FIG. 1 is depressed and the additional power memorized at that point of time by the operation control means 48 is used as the additional power of the measuring portion for near viewing portion, and the measurement is terminated. This measuring procedure is shown in the flowchart of FIG. 10.

In the above-described embodiment, an imaging device is employed as the light beam detecting means, but alternatively, a one-dimensional line sensor, a position detector (PSD), a photosensor or the like may be used to detect the position of the light beam. Also, the TV monitor 51 is used as the display means for displaying the alignment state, whereas this is not restrictive, but display means such as an LED or liquid crystal may also be used without any difficulty.

Also, a plurality of openings are used as the light beam selecting means, but alternatively, use may be made of means of a ring-like shape or means of a shape conforming to the light beam detecting means.

Also the prismatic power in the vicinity of zero is enlarged and displayed, but the distance from the optical axis of the lens may be displayed in lieu of the prismatic power.

As described above, according to the above-described embodiment, even in the measurement of the near viewing portion of a progressive focal lens in which it is difficult to know the region to be measured, the measurement of additional power can be simply accomplished without the use of a positioning sheet or the like prepared for each kind of lens.

Another embodiment of the present invention will now be described in detail with reference to the drawings.

Figure 11:
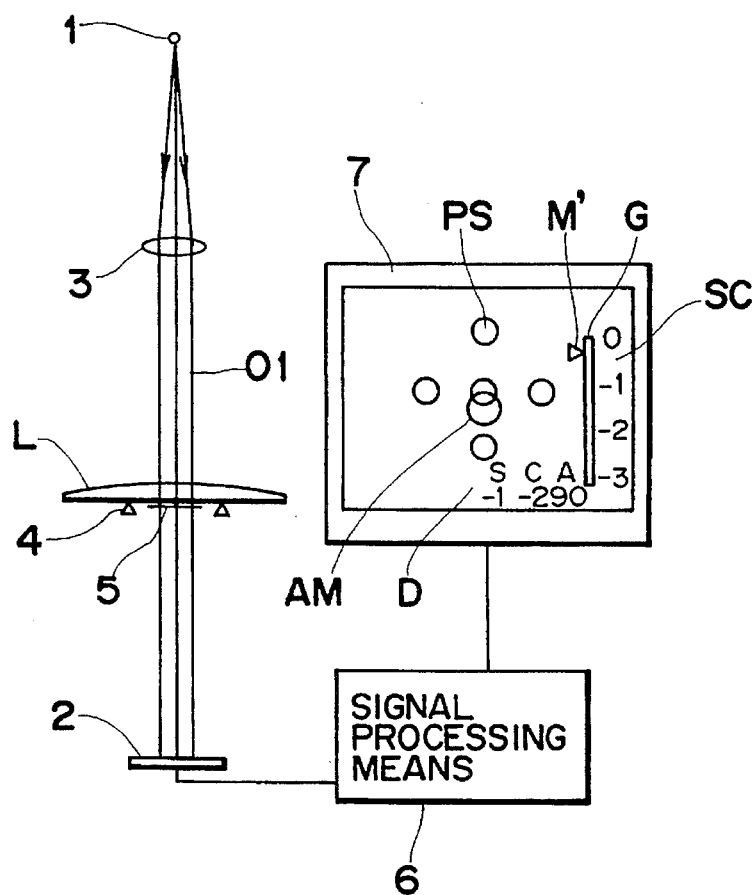
FIG. 11 shows the construction of another embodiment of the present invention.

Referring to FIG. 11 which shows the construction of the present embodiment, a lens 3, a lens L to be examined brought into contact with a contacting member 4 and a five-aperture stop 5 are disposed on an optical axis 01 leading from a light source 1 for measurement to a two-dimensional array sensor 2. The five-aperture stop 5 has an opening on the optical axis and four openings symmetrical with respect to the optical axis. Further, the output of the two-dimensional array sensor 2 is connected to display means 7 such as a CRT via signal processing means 6 such as a signal processing unit.

Figure 13:
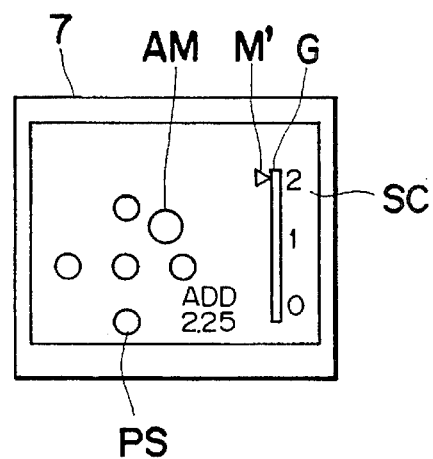
FIG. 13 is an illustration of the screen of display means during the measurement of input times.

A light beam from the light source 1 for measurement is collimated by the lens 3, passes through the lens L to be examined and the five-aperture stop 5 and is received as spot images PS comprising five circles as shown in FIG. 13, by the two-dimensional array sensor 2. A signal from the two-dimensional array sensor 2 is output to the display means 7 via the signal processing means 6 and is displayed as the spot images PS.

During the measurement, the signal processing means 6 continuously analyzes the received positions of the spot images PS from the signal of the two-dimensional array sensor 2, and continuously calculates the spherical power S, the cylindrical power C, the angle of cylinder A and the degree of asymmetrical asphericity. The degree of asymmetrical asphericity is calculated from the asymmetry of the positions of the spot images PS on both sides of the central spot image PS with respect to the central spot image PS. A scale SC and the spherical power are displayed on the right side of the screen of the display means 7. A bar graph G indicates the spherical power irrespective of the spherical power when the M' indicates the degree of sphericity when the degree of asphericity is below a predetermined value. AM designates an alignment mark which becomes the standard when the examiner effects the alignment of the lens while looking at the spot images PS.

Figure 12:
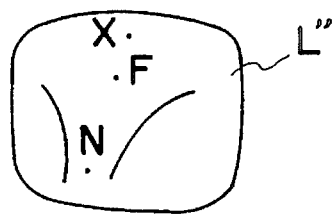
FIG. 12 is a front view of a progressive multifocal lens.

When the refractivity of a progressive multifocal lens L" shown in FIG. 12 is to be measured, measurement is first effected at a far viewing measuring point F. When the lens is placed into the optical path, the spherical power is displayed as the bar graph G irrespective of the degree of asphericity. When the lens comes to a position where the degree of asphericity measured is below a predetermined value, the refractive values are once preserved at that position, and the mark M' is displayed on the scale SC, and in the lower portion of the display means 7, the refractive values D corresponding to the mark M' are displayed as the spherical power S, the cylindrical power C and the angle of cylinder A. During the alignment of the lens, the bar graph G indicates the spherical power at that point of time. The display of the mark M' and the refractive values D are renewed each time a value more on the far viewing side than the value being displayed during the alignment appears.

After adjusting the lens L to a position which roughly seems to be the point F of the lens, the examiner moves the lens L back and forth and to left and right while looking at the mark M', thereby looking for a position at which the spherical power is maximum. The far viewing measuring point F is a position at which the degree of asphericity is below a predetermined value and the spherical power is the most in the plus direction. When the mark M' does not become any larger, a measurement button, not shown, is depressed to thereby memorize the value of D being displayed. Since there are various degrees of spectacle lenses, it will be easier to see the scale SC, if several diopters on the far viewing side are enlarged and displayed as shown.

Although in the foregoing description, it has been stated that the refractive values D designate the values corresponding to the mark M', design may be made such that they are the refractive values being continuously measured during the alignment. Design may also be made such that whether the degree of asymmetrical asphericity is below a predetermined value is displayed with a mark (*) or parentheses.

After the termination of the measurement of the refractivity at the far viewing measuring point F of the progressive multifocal lens, the refractive power at the near viewing measuring point N is measured. When an additional power measuring button, not shown, is first depressed, the difference between the spherical power S at the position where the optical axis crosses the lens at the moment and the spherical power S at the far viewing measuring point F is calculated as additional power ADD by the signal processing means 6. As shown in FIG. 13, the bar graph G and mark M' in the right side of the screen of the display means 7 now display the value of the additional power ADD on the scale SC. The bar graph G displays the then value of the additional power, that is the difference, sequentially irrespective of the degree of asphericity, while the mark M' and the value D in the lower portion of the screen show the additional power within the predetermined degree of asphericity since they are renewed each time a value greater than before is measured the maximum value of the additional power is always displayed. The examiner moves the lens and looks for the right position in the vicinity which seems to be the near viewing position N, and when the value of the additional power ADD being displayed is judged to be a maximum value by being no longer renewed, the examiner depresses the measurement button to thereby memorized the value D, thus terminating the measurement.

Although the degree of asphericity below a predetermined value has been adopted as the condition for displaying the mark M' and the lower numerical value D, the condition that the difference between the cylindrical power C at the current measuring point of time and the cylindrical power C at the far viewing measuring point F should be below a predetermined value may be additionally used. Neither of these conditions is satisfied when the measuring point is deviated from the progressive zone of the lens. As a further alternative, design may be made such that either of the mark M' and the value D is displayed.

Figure 14:
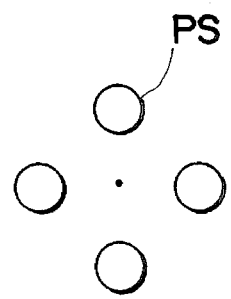
FIG. 14 is an illustration of spot images received by a two-dimensional array sensor when a four-aperture stop is used.

A four-aperture stop having four openings, exclusive of the opening on the optical axis 01, may be employed in lieu of the five-aperture stop 5. In such case, spot images PS comprising four small circles as shown in FIG. 14 are received by the two-dimensional array sensor 2. The degree of asymmetrical asphericity of the lens L to be examined is found from the degree of coincidence between the middle point of the segment linking the centers of the two spot images PS symmetrical with respect to the optical axis. Alternatively, design can be made such that three of the four spot images PS are selected to thereby find the cylindrical power C and the difference in the cylindrical power C by the difference between the manners of selecting the spot images PS is used as the degree of asphericity and the measured value D is displayed if this degree of asphericity is below a predetermined value.

Figure 15:
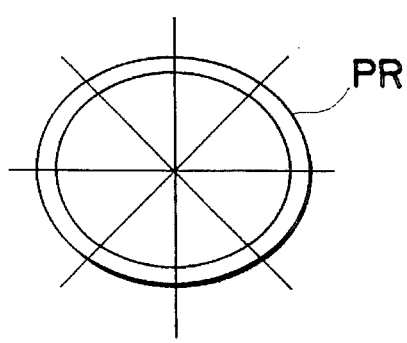
FIG. 15 is an illustration of a ring image received by the two-dimensional array sensor when a ring stop is used.

Also, a ring stop may be employed in lieu of the five-aperture stop 5. In such case, a ring image PR as shown in FIG. 15 is received by the two-dimensional array sensor 2. When astigmatism is included in the lens L to be examined, the ring image PR becomes an ellipse instead of a circle. By the signal processing means 6, the two equations of the ellipses of the ring image PR are obtained from the two sets of the four points of intersection between the lines passing through the center of the ring image PR and the ring image PR, and the difference between the ellipse can be used as the degree of asymmetrical asphericity. Also, two one-dimensional array sensors or an analog light position detector can be used in lieu of the two-dimensional array sensor.

As described above, the lens refractivity measuring apparatus according to the above-described embodiment is designed to detect the degree of asymmetrical asphericity of the lens to be examined, and display the refractive value on the display means when the degree of asymmetrical asphericity of the lens to be examined is below a predetermined value and therefore the position to be measured can be confirmed by whether the refractive value is displayed on the display means, and this leads to the facilitation of the measurement of the refractive power of a progressive multifocal lens. In an ordinary lens as well, when aberrations occur in the marginal portion thereof, this condition is not satisfied and therefore, the confirmation of alignment can be accomplished.

What is claimed is:

1. A lens measuring apparatus comprising:

a light beam projecting unit for projecting a light beam onto a lens to be examined;

a photoelectric detector for detecting a position of the light beam projected onto and passing through said lens to be examined; and a calculator for calculating refraction information of said lens to be examined on the basis of the detection by said photoelectric detector, said calculator, when it calculates the refraction information of the near viewing portion of a progressive focal lens as said lens to be examined, comparing refraction information calculated successively while the examined position of said lens to be examined is moved with the already calculated and memorized refraction information of the far viewing portion of said lens to be examined and successively calculating input times in each portion to be examined, said calculator further memorizing the maximum value of the successively calculated additional power while successively renewing it.

2. The apparatus according to claim 1, further comprising light beam selecting means for selecting a part of the light beam from said light beam projecting unit and wherein said photoelectric detector photoelectrically detects the light beam projected onto said lens to be examined and selected by said light beam selecting means.

3. The apparatus according to claim 2, wherein said light beam selecting means includes a multiaperture stop disposed on and exit side of said lens to be examined.

4. The apparatus according to claim 3, wherein said calculator calculates the refraction information of said lens to be examined from incident positions of a plurality of light beams emerging from said multiaperture stop on said photoelectric detector.

5. The apparatus according to claim 1, further comprising display means for displaying a result of the calculation by said calculator.

6. The apparatus according to claim 5, wherein said display means displays a maximum value of the current additional power memorized by said calculator.

7. The apparatus according to claim 6, wherein said display means graphically displays at a time the additional power successively calculated by said calculator.

8. The apparatus according to claim 6, wherein said display means displays an image of the light beam on said photoelectric detector simultaneously.

9. The apparatus according to claim 6, wherein said display means displays a state of the degree of prism in a predetermined direction in the examined portion of said lens to be examined simultaneously.

10. The apparatus according to claim 5, wherein said display means effects display so as to enable an examiner to align the lens to be examined relative to the apparatus while looking at said display means.

11. A lens measuring apparatus comprising:

a light beam projecting unit for projecting a light beam onto a lens to be examined;

a photoelectric detector for detecting a position of the light beam projected onto and passing through said lens to be examined;

a display unit;

a calculator for calculating refraction information of said lens to be examined on the basis of the detection by said photoelectric detector, said calculator detecting the degree of asymmetrical asphericity of the examined portion of said lens to be examined on the basis of the detection by said photoelectric detector, said calculator causing said display unit to display the refraction information of said lens to be examined when a degree of asymmetrical asphericity of the examined portion of said lens to be examined is below a predetermined value.

12. The apparatus according to claim 11, wherein said calculator causes said display unit to display a maximum value of additional power as the refraction information of said lens to be examined when the degree of asymmetrical asphericity of the examined portion is below the predetermined value.

13. The apparatus according to claim 12, wherein said calculator renews the maximum value of the additional power displayed by said display unit when the degree of asymmetrical asphericity of the examined portion is below the predetermined value and a greater value is measured in the measurement of the spherical power of the examined portion.

14. The apparatus according to claim 11, further comprising light beam selecting means for selecting a part of the light beam from said light beam projecting unit and wherein said photoelectric detector photoelectrically detects the light beam projected onto said lens to be examined and selected by said light beam selecting means.

15. The apparatus according to claim 14, wherein said light beam selecting means includes a multiaperture stop disposed on an exit side of said lens to be examined.

16. The apparatus according to claim 15, wherein said calculator calculates the refraction information of said lens to be examined from the incident positions of a plurality of light beams emerging from said multiaperture stop on said photoelectric detector.

17. The apparatus according to claim 16, wherein said calculator calculates the degree of asymmetrical asphericity of the examined portion of said lens to be examined from the symmetry of said plurality of light beams on said photoelectric detector.

18. The apparatus according to claim 11, wherein said calculator further calculates the difference between the cylindrical power of the examined portion of said lens to be examined and the cylindrical power in the far viewing portion of said lens to be examined, and causes said display unit to display the maximum value of the additional power of said lens to be examined when said difference is below a predetermined value.

19. A lens measuring apparatus comprising:

a light beam projecting unit for projecting a light beam onto a lens to be examined;

a photoelectric detector for detecting a position of the light beam projected onto and passing through said lens to be examined;

a display unit; and a calculator for calculating refraction information of said lens to be examined on the basis of the detection by said photoelectric detector, said calculator detecting the degrees of assymetrical asphericity of the examined portion of said lens to be examined on the basis of the detection by said photoelectric detector, said calculator causing said display unit to display an indication when a degree of asymmetrical asphericity of the examined portion of said lens to be examined is below a predetermined value.

20. The apparatus according to claim 19, wherein said display unit displays a value indication of the refraction information as the indication.

* * * * *

UNITED STATES PATENT AND TRADEMARK OFFICE
CERTIFICATE OF CORRECTION

PATENT NO. : 5,489,978
DATED : February 6, 1996
INVENTOR(S) : TOSHIAKI OKUMURA, et al.

It is certified that error appears in the above-indentified patent and that said Letters Patent is hereby corrected as shown below:

COLUMN 1

Line 22, "may" should read --power may--.
Line 46, "e" should read --the--.

COLUMN 7

Line 23, "and" should read --an--.

COLUMN 8

Line 53, "assymmetrical" should read --asymmetrical--.

Signed and Sealed this

Ninth Day of July, 1996

Attest:

BRUCE LEHMAN

Attesting Officer  Commissioner of Patents and Trademarks